(12) United States Patent
Stoltz et al.

(10) Patent No.: US 6,740,233 B2
(45) Date of Patent: May 25, 2004

(54) BAG CLIP FOR A POOL CLEANER FILTER BAG

(75) Inventors: Gerhardus J. Stoltz, Temecula, CA (US); David A. Klimas, Ramona, CA (US)

(73) Assignee: Polaris Pool Systems, Inc., Vista, CA (US)

( * ) Notice: Subject to any disclaimer, the term of this patent is extended or adjusted under 35 U.S.C. 154(b) by 0 days.

(21) Appl. No.: 10/400,118

(22) Filed: Mar. 25, 2003

(65) Prior Publication Data

US 2003/0205513 A1 Nov. 6, 2003

Related U.S. Application Data

(60) Provisional application No. 60/377,878, filed on May 3, 2002.

(51) Int. Cl.[7] .............................. E04H 4/16; B01D 29/27
(52) U.S. Cl. .................... 210/169; 210/232; 210/416.2; 15/1.7
(58) Field of Search ................................. 210/169, 232, 210/416.1, 416.2; 4/490; 15/1.7

(56) References Cited

U.S. PATENT DOCUMENTS

| | | |
|---|---|---|
| 3,822,754 A | 7/1974 | Henkin et al. |
| 4,240,173 A | 12/1980 | Sherrill |
| 4,558,479 A | 12/1985 | Greskovics et al. |
| 4,575,423 A | 3/1986 | Alanis et al. |
| 4,589,986 A | 5/1986 | Greskovics et al. |
| 4,618,420 A | 10/1986 | Alanis |
| D288,373 S | 2/1987 | Alanis |
| 4,643,217 A | 2/1987 | Frentzel |
| D294,963 S | 3/1988 | Alanis et al. |
| 4,729,406 A | 3/1988 | Frentzel |
| 4,880,531 A | 11/1989 | Blake et al. |
| 5,105,496 A | 4/1992 | Gray, Jr. et al. |
| 5,768,734 A | 6/1998 | Dietrich |
| 5,863,425 A | 1/1999 | Herlehy et al. |

*Primary Examiner*—Fred G. Prince
(74) *Attorney, Agent, or Firm*—Kelly Bauersfeld Lowry & Kelley, LLP

(57) ABSTRACT

A bag clip is provided for removably mounting a filter bag onto a suction mast of a pool cleaner to collect and retain debris vacuumed by the pool cleaner from submerged floor and side wall surfaces of a swimming pool. The bag clip includes an inner support collar for reception into an open mouth of a porous filter bag, in combination with an outer clamp ring for releasibly clamping the bag mouth onto the inner support collar. The bag clip additionally includes quick release latch tabs for snap fit mounting onto the pool cleaner suction mast. In use, the outer clamp ring can be quickly and easily opened to permit filter bag removal and disposal of collected debris, followed by re-installation of the same or a replacement filter bag.

25 Claims, 4 Drawing Sheets

BAG CLIP FOR A POOL CLEANER FILTER BAG

This application claims the benefit of copending U.S. Provisional Application No. 60/377,878, filed May 3, 2002.

BACKGROUND OF THE INVENTION

This invention relates generally to improvements in cleaning devices and equipment for use in cleaning swimming pools and the like. More particularly, this invention relates to an improved bag clip for use with a swimming pool cleaner of the type designed for travel over submerged pool surfaces to collect grit and debris settled thereon, wherein the improved bag clip is designed for facilitated removable mounting of a porous filter bag onto a pool cleaner suction mast to collect and retain debris vacuumed by the pool cleaner from submerged floor and side wall surfaces of a swimming pool. The bag clip facilitates filter bag removal for disposal of collected debris, followed by quick and easy re-installation of the same or a replacement filter bag.

Automatic swimming pool cleaners are generally well known in the art for use in maintaining a swimming pool in an overall state of cleanliness. In this regard, residential and commercial swimming pools normally include a standard water filtration system including a main circulation pump and related main filter unit for filtering the pool water. The filtration system is typically operated for several hours on a daily basis to draw water from the pool for flow through the main filter unit and subsequent return circulation to the pool, wherein the filter unit includes an appropriate filter media for collecting and thus removing solid debris such as fine grit and silt, twigs, leaves, insects, and other particulate matter suspended within the pool water. Although such filtration systems function efficiently to collect suspended particulate, it has been recognized that some particulate tends to settle onto submerged pool floor and wall surfaces and thus is not removed by the standard filtration system. Automatic swimming pool cleaners have been developed and are widely used to assist in a more thorough cleaning of the pool by directly collecting such settled matter, and/or by re-suspending the settled matter so that it can be collected by the main filter unit.

More specifically, in one common form, the automatic swimming pool cleaner comprises a relatively compact wheeled housing adapted to travel randomly over submerged floor and wall surfaces of the pool. The cleaner is normally connected by a hose into the standard filtration system, such as by connection to the positive pressure discharge side of the system as described in U.S. Pat. Nos. 5,863,425; 4,558,479; 4,589,986; and 3,822,754, or by connection to the negative pressure suction side of the system as described in U.S. Pat. Nos. 5,105,496; 4,729,406; and 4,643,217. In either case, the filtration system provides a water flow to and through the cleaner, wherein this water flow is typically used to create or induce a suction flow through a suction mast for vacuuming grit and debris through the suction mast into a porous mesh filter bag mounted on a downstream end thereof. The water flow through the pool cleaner is also frequently used to power a hydraulic drive means which causes the cleaner to travel about within the swimming pool. The filter bag is designed for periodic removal from the cleaner so that accumulated debris therein can be disposed, followed by remounting of the filter bag onto the pool cleaner. In this regard, the filter bag is normally constructed from a material capable of withstanding prolonged exposure to sun, water and pool chemicals in a swimming pool environment.

Filter bags for pool cleaners are commonly constructed and shaped for mounting onto the pool cleaner in a predetermined orientation in order to achieve maximum cleaning effectiveness. In particular, according to one common filter bag configuration, the bag is designed with a generally cylindrical open mouth connected to a mounting collar or the like adapted for removable mounting onto an upper end of the pool cleaner suction mast. The bag is shaped to define a hollow interior which extends upwardly above the mouth and then expands rearwardly. With this geometry, debris flowing upwardly from the suction mast into the bag interior will tend to displace to and settle within a rear region or pocket of the bag as a result of the forward motion of the pool cleaner. Debris retention within the rear pocket is important to prevent collected debris from falling back through the suction mast when the pool cleaner, normally operated on an intermittent basis, is turned off. Some filter bags include a releasible seam at the rear pocket for facilitated emptying of the bag. Exemplary filter bags of this general type are shown and described in U.S. Pat. Nos. 4,618,420; 4,575,423; and D288,373.

In the past, various attachment means have been provided for removably mounting the filter bag onto the pool cleaner suction mast, to accommodate periodic filter bag removal for disposal of collected debris. In this regard, early filter bag attachment arrangements utilized releasible Velcro type fasteners, as depicted in U.S. Pat. Nos. 4,618,420; D288,373; 4,575,423; and D294,963. An improved mounting device including springable latch tabs for quick-connect-disconnect filter bag mounting is shown in U.S. Pat. No. 4,589,986.

U.S. Pat. No. 5,863,425 depicts a similar quick release latch tab construction on a filter bag mounting collar designed for unidirectional mounting of the filter bag in a correct front-to-rear orientation on the pool cleaner suction mast, and further wherein slidably interfitting ring elements accommodate disassembly of the filter bag from the mounting collar which can then be re-used with a replacement filter bag. While these sliding ring elements permit filter bag separation from the mounting collar for disposal and replacement, they are sufficiently difficult and inconvenient to manipulate whereby this mounting collar is not conducive for use with a simplified and low cost filter bag designed for one-time use and disposal. Instead, at best, the filter bag has been removed from the mounting collar and replaced with a new bag at periodic intervals of several months or more.

There exists a need for further improvements in and to means for mounting a porous filter bag onto a pool cleaner suction mast, wherein the mounting means is designed to accommodate quick and easy filter bag replacement and disposal after a single use. The present invention fulfills this need and provides further related advantages.

SUMMARY OF THE INVENTION

In accordance with the invention, an improved bag clip is provided for removably mounting a filter bag onto a suction mast of a pool cleaner to collect and retain debris vacuumed by the pool cleaner from submerged floor and side wall surfaces of a swimming pool. The bag clip includes quick release mounting means for quick and easy assembly with the open mouth of a porous filter bag. In the preferred form, the bag clip is designed for mounting onto the suction mast of currently available pool cleaners, and accommodates facilitated filter bag removal and replacement without requiring bag clip removal from the pool cleaner.

In the preferred form of the invention, the improved bag clip comprises an inner support collar for sliding reception into the open mouth of a porous filter bag, in combination with an outer clamp ring for releasibly clamping the bag mouth onto the inner support collar. The clamp ring includes a pair of interlocking, generally semi-circular clamp segments pivotally mounted on opposite sides of the inner support collar for movement between an interlocking closed position clamping the bag mouth securely onto the inner support collar, and a spaced-apart open position permitting substantially unrestricted sliding lift-off separation of the bag mouth from the inner support collar. The preferred bag clip additionally includes quick release latch tabs for snap fit mounting onto the suction mast of a currently available pool cleaner. The bag clip may also include alignment means of the type shown and described in U.S. Pat. No. 5,863,425 for mounting onto the suction mast in a predetermined orientation, and/or for mounting of the bag mouth thereon in a predetermined orientation. In use, the outer clamp ring can be quickly and easily opened to permit filter bag removal and disposal of collected debris, followed by re-installation of the same or a replacement filter bag.

Other features and advantages of the invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
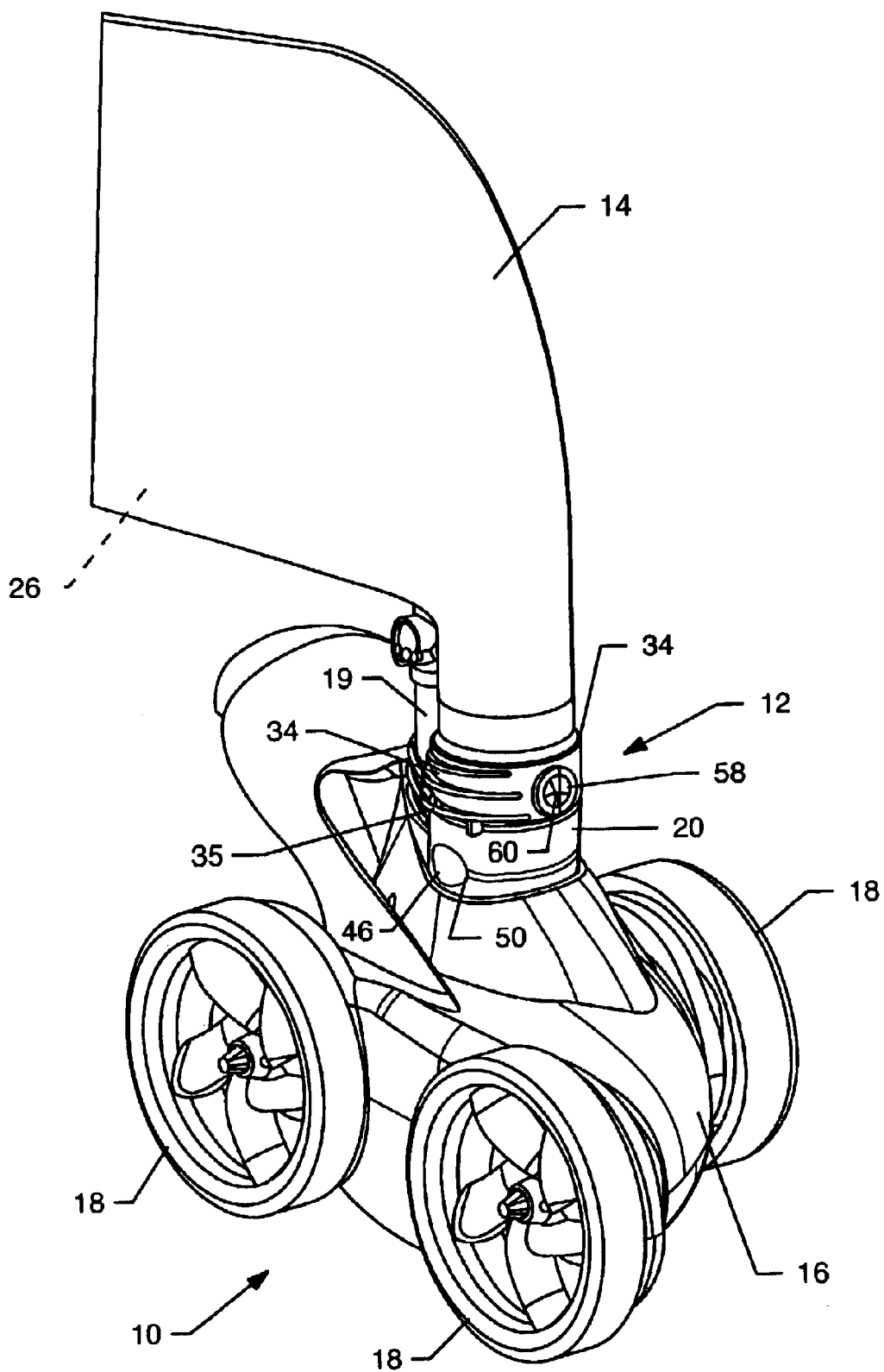
FIG. 1 is a perspective view of a cleaner having a bag clip constructed in accordance with the novel features of the invention for removably mounting a filter bag onto the pool cleaner.
Figure 4:
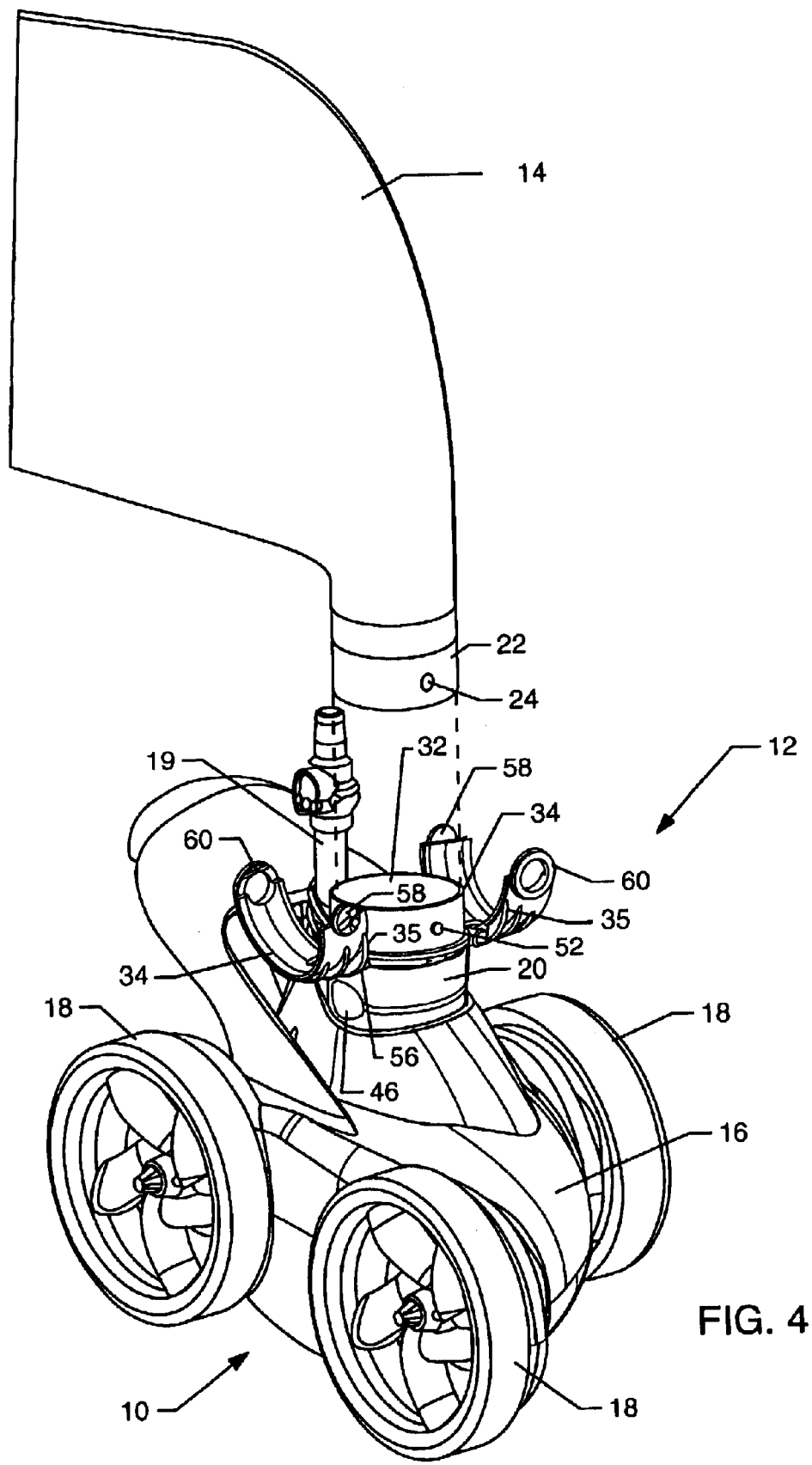
FIG. 4 is a perspective view similar to FIG. 1, but showing the bag clip in an open position for removable mounting of a filter bag thereon.

As shown in the exemplary drawings, a pool cleaner referred to generally in FIGS. 1 and 4 by the reference numeral 10 is equipped with a removably mounted bag clip 12 for removable installation of a porous filter bag 14 used to collect and retain particulate debris vacuumed by the pool cleaner 10 from submerged floor and side wall surfaces of a swimming pool or the like. The bag clip 12 accommodates quick and easy removal of a filter bag 14 which is filled or substantially filled with collected debris for convenient disposal, followed by similarly quick and easy installation of a replacement filter bag for resumed pool cleaner operation.

The pool cleaner 10 generally comprises a conventional automatic swimming pool cleaner of the type adapted for substantially random travel over submerged pool surfaces to pick up and collect settled particulate matter such as grit, silt, twigs, leaves, etc., and/or to assist in re-suspending such matter so that it can filtered from the pool water by a main filtration system (not shown). The pool cleaner 10 comprises a compact housing 16 carried on a plurality of wheels 18. An internal drive means (not shown) is provided for causing the pool cleaner 10 to travel about within the pool, with said internal drive means being typically powered hydraulically by a water flow coupled to a supply mast 19 via a hose (not shown) with a main pool water filtration system (also not shown). In one common form, the water flow is a positive pressure flow to the pool cleaner as shown and described in U.S. Pat. Nos. 5,863,425; 4,558,479; 4,589,986; and 3,822,754, which are incorporated by reference herein. In another common form, the water flow is a negative pressure or suction flow from the pool cleaner as shown and described in U.S. Pat. Nos. 5,105,496; 4,729,406; and 4,643,217, which are also incorporated by reference herein. In either case, the water flow also creates or induces an upward suction or vacuum flow of water through a generally vertically oriented suction mast 20 on the pool cleaner 10 to vacuum particulate matter settled upon submerged pool surfaces. The bag clip 12 of the present invention is designed for quick release mounting, preferably in a desired and predetermined orientation, at the upper end of the suction mast 20, and further provides means for quick release mounting of the porous filter bag 14 for capturing and retaining the debris vacuumed upwardly through the suction mast 20.

In general terms, the filter bag 14 may have an overall configuration similar to the filter bags shown and described in U.S. Pat. Nos. 4,618,420; 4,575,423: and D288,373, which are incorporated by reference herein. More particularly, as shown, the filter bag 14 is formed from a porous mesh fabric or similar porous material of selected grade and pore size to define a hollow bag having a generally cylindrical and downwardly open mouth 22 (FIGS. 3 and 4) at a front and lower end thereof. The bag mouth 22 may incorporate orientation alignment means for assembly with the bag clip 12 in a predetermined rotational orientation, with an alignment port 24 being illustrated in FIGS. 3 and 4. When the illustrative filter bag 14 is installed onto the bag clip 12, which is in turn installed onto the upper end of the pool cleaner suction mast 20, the filter bag 14 extends from the open mouth 22 upwardly and then turns rearwardly to define an enlarged internal chamber or pocket 26 for collecting and retaining vacuumed debris. In operation, the suction water flow upwardly through the suction mast 20 carries particulate matter upwardly through the bag clip 12 and further upwardly into the filter bag 14 as the pool cleaner 10 travels forwardly within the swimming pool, whereby the particulate matter enters the bag and tends to settle therein within the rear pocket 26. Persons skilled in the art will recognize and appreciate that alternative filter bag configurations may be used.

In accordance with the present invention, the bag clip 12 is provided for quick release removable mounting of the filter bag 14 in a manner conducive to disposal of the filter bag and its contents following a single use for collecting vacuumed debris. The bag clip 12 thus permits the filter bag 14 to be constructed from a lightweight and relatively economical porous mesh material capable of withstanding short-term single use exposure to a swimming pool environment, and further wherein the bag mouth 20 can be constructed in a simple cylindrical configuration without requiring a molded plastic or relatively stiff vinyl-based reinforcement cuff of the type used with prior filter bags designed for re-use following emptying and disposal of debris collected therein. In the preferred form, the bag clip 12 is additionally designed for quick release removable mounting onto the suction mast of currently available pool cleaners, to retrofit such pool cleaners for use with lightweight and disposable single-use filter bags.

Figure 2:
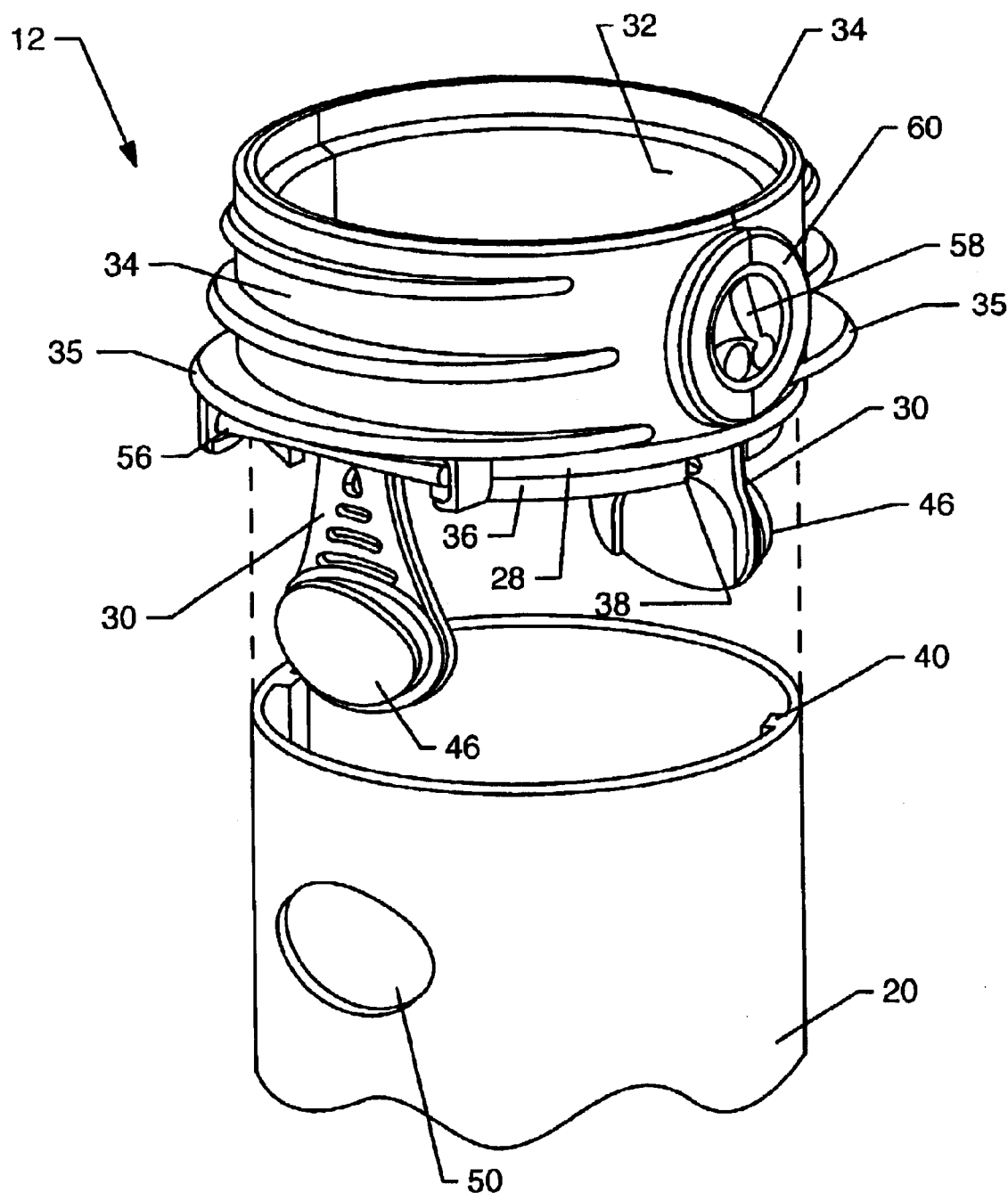
FIG. 2 is an enlarged fragmented and exploded perspective view showing removable mounting of the bag clip onto the pool cleaner.
Figure 3:
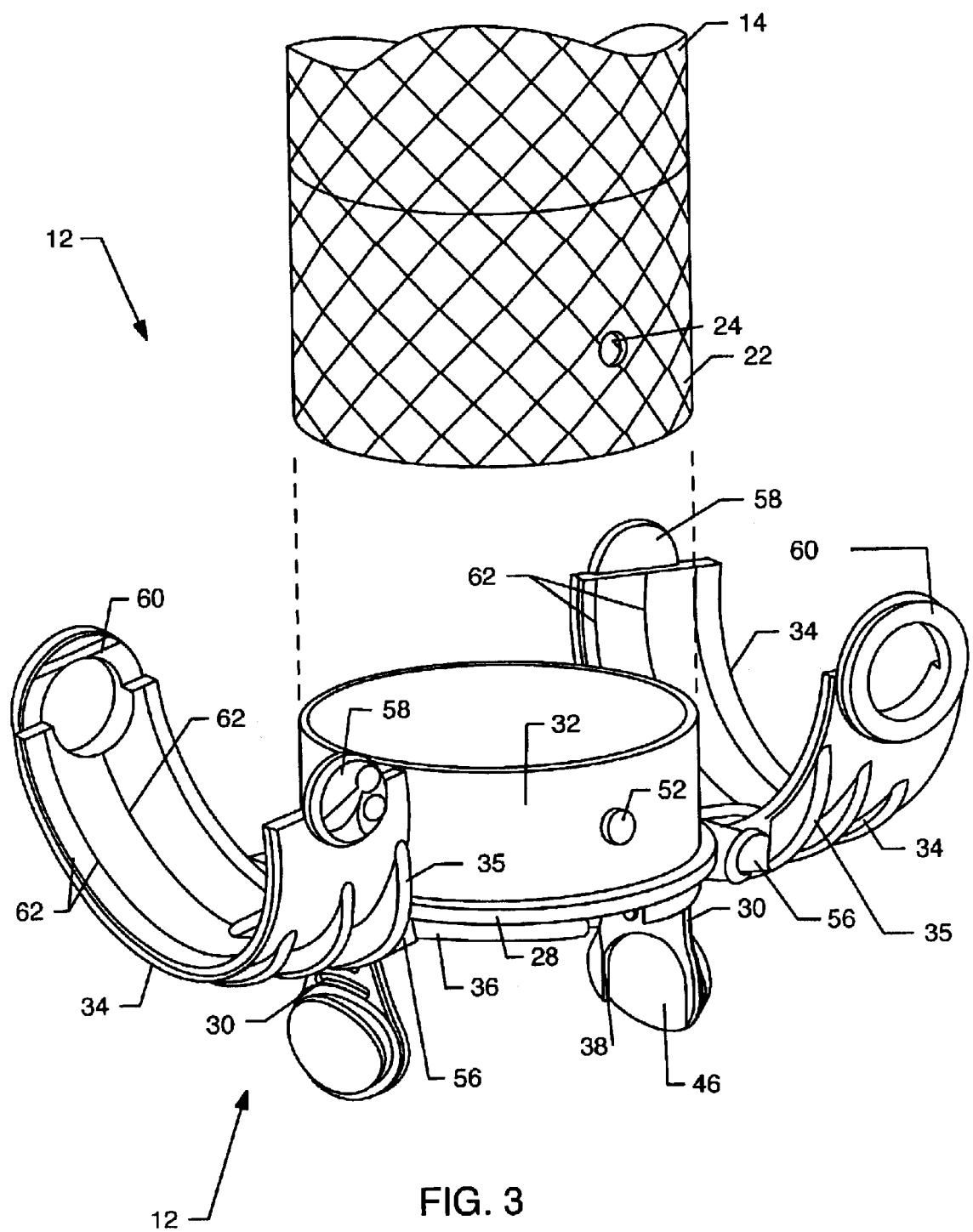
FIG. 3 is an enlarged and exploded perspective view showing removable mounting of a filter bag onto the bag clip.

The bag clip 12 is shown in detail in FIGS. 2–3, and generally comprises a base or base ring 28 carrying a pair of springable latch arms 30 for quick release, substantially snap-fit removable mounting onto the upper end of the pool cleaner suction mast 20. The base ring 28 incorporates an upstanding, generally cylindrical inner support collar 32 having a size and shape for slide-fit reception of the open bag mouth 22 thereover. In addition, the bag clip includes clamping means shown in the form of an outer clamp ring having a pair of generally semi-circular or half-cylindrical clamp segments 34 pivotally mounted onto opposite sides of the base ring 28 for movement between an open position retracted from the inner collar 32 (FIGS. 3 and 4) and a closed interlocking position extending circumferentially and relatively snugly about the inner collar 32 (FIGS. 1 and 2). The entire bag clip 12 may be conveniently constructed from lightweight molded plastic.

More particularly, the base ring 28 has a generally circular size and shape for nested mounting onto the upper end of the cleaner suction mast 20. In the preferred form as shown, the base ring 28 may include a downwardly extending circular rim 36 sized for slide-fit reception a short distance into the suction mast upper end to orient the inner support collar 32 at the top of the suction mast 20 in a position generally coaxial therewith. This rim 36 may incorporate an open notch 38 therein for receiving a matingly shaped short alignment key 40 (FIG. 2) formed within the suction mast 20, whereby the bag clip 12 is mounted onto the suction mast 20 in a single predetermined position of front-to-rear rotational alignment therewith.

The latch arms 30 are formed generally at the opposed lateral sides of the base ring 28 and project axially downwardly therefrom for slide-fit reception into the open upper end of the suction mast 20. Each latch arm 30 comprises an axially extending spring arm shown with an upper narrow cross sectional size which extends downwardly from the base ring 28 with a widening or tapering shape to a lower end carrying a radially outwardly presented button-shaped latch tab 46. These latch tabs 46 are tapered toward thinner lower ends so that they can be slidably inserted into the suction mast 20 and pushed downwardly toward a positions aligned with a laterally open pair of latch ports 50 in the suction mast. The springable latch arms 30 deflect radially inwardly to accommodate this motion, and bias the latch tabs 46 to spring outwardly and lock within the latch ports 50 upon alignment therewith. Subsequent bag clip removal from the suction mast can be accomplished quickly and easily by fingertip pressing radially inwardly on the latch tabs 46 for disengagement thereof from the latch ports 50, and then lifting the bag clip 12 from the suction mast 20. Further construction details of the alignment and quick release mounting structure for removably mounting the bag clip 12 in a predetermined orientation on the suction mast 20 are found in U.S. Pat. No. 5,863,425, which is incorporated by reference herein.

The inner support collar 32 extends upwardly from the base ring 28 for quick and easy slide-fit reception into the open mouth 22 of the filter bag 14, with the clamp segments 34 of the outer clamp ring in an open position as viewed in FIG. 3. In a preferred form, the support collar 32 also includes orientation alignment means for assembly with the filter bag 14 in a predetermined rotational orientation, such as a short alignment post 52 (FIG. 3) for reception into the alignment port 24 formed in the bag mouth 22. When the illustrative filter bag 14 is fully installed onto the inner support collar 32, with a lowermost margin of the bag mouth 22 positioned substantially on a short peripheral flange defined by the base ring 28, the outer clamp ring can be moved to the closed position by shifting the clamp segments 34 quickly and easily to the closed and interlocked position extending circumferentially about and securely clamping the filter bag 14 onto the bag clip 12. Alternative means for rotationally aligning the bag clip 12 relative to the filter bag 14 may be used.

The clamp segments 34 are shown in the form of a pair of generally identical half-cylindrical components having their lower margins pivotally connected respectively to the opposite side edges of the base ring 32 by a pair of hinge units 56. These hinge units 56 each permit rotational movement of the associated clamp segment 34 between the open position retracted from the inner support collar 32 as viewed in FIGS. 3 and 4, and a closed position wrapped generally concentrically about the inner support collar 32 in clamped relation therewith as viewed in FIGS. 1 and 2. External ribs on the clamp segments 34 are easily grasped manually to facilitate movement between these open and closed positions, with a lower rib 35 having a size and shape to provide a stop bearing against the hinge units 56 to support the clamp segments 34 in the open position as viewed in FIG. 3. The hinge units 56 additional mount the clamp segments 34 to the support collar 32 to prevent separation from the support collar (which is connected to the pool cleaner mast 20) in the event that the cleaner is lifted by grasping the filter bag 14.

The clamp segments 34 further include a latch tab 58 at one end and a matingly shaped latch port 60 at an opposite end. In the illustrative embodiment, the latch tab 58 of one clamp segment 34 is positioned for substantially snap-fit interlocking reception into the latch port 60 of the other clamp segment 34, and vise versa, when the clamp segments 34 are shifted to the closed position. With this arrangement, the clamp segments 34 secure the filter bag mouth 22 firmly onto the inner support collar 32 for normal pool cleaner operation to vacuum debris upwardly through the suction mast 20 and into the filter bag 14. This clamping engagement may be enhanced by forming the internal surfaces of the clamp segments 34 to include one or more short, radially inwardly extending clamp ribs 62 (FIG. 3) for improved pressure gripping and retention of the bag mouth on the support collar 32. Similar counterpart clamp ribs may also be formed on the exterior surface of the inner support collar. Alternative means for gripping and retaining the bag mouth, such as a rubber O-ring or band, may also be used wherein the band is wrapped about the inner support collar 32 prior or subsequent to mounting of the filter bag mouth thereon to provide a compressible non-slip surface against which the bag mouth is retained in clamped relation.

When filter bag removal from the pool cleaner 10 is desired for purposes of discarding the collected debris, the filter bag 14 is quickly and easily separated from the bag clip 12, with or without corresponding removal of the bag clip from the pool cleaner suction mast 20. The outer clamp ring is opened quickly and easily by manually pulling radially outwardly on the latch port ends of the clamp segments to release the latch ports 60 from the associated latch tabs 58. The pair of clamp segments 34 can then be rotated quickly and easily to the open positions permitting simple slide-off removal of the filter bag mouth from the inner support collar. The filter bag 14 and the contents thereof can then be discarded as a unit, and a replacement or new filter bag 14 can be installed quickly and easily onto the bag clip 12 for resumed pool cleaner operation. Alternately, if desired, the removed filter bag 14 can be emptied of collected debris and then re-installed onto the bag clip 12.

A variety of further modifications and improvements in and to the bag clip 12 of the present invention will be apparent to those persons skilled in the art. For example, persons skilled in the art will recognize and appreciate that alternative means may be provided for removably mounting the bag clip onto a pool cleaner suction mast, including but not limited to Velcro-type mounting arrangements of the type shown and described in U.S. Pat. Nos. 4,618,420; D288,373; 4,575,423; and D294,963, which are incorporated by reference herein. Accordingly, no limitation on the invention is intended by way of the foregoing description and accompanying drawings, except as set forth in the appended claims.

What is claimed is:

1. A bag clip for use with a pool cleaner having a suction mast for water flow therethrough to vacuum debris from submerged surfaces of a swimming pool, said bag clip comprising:
   a base for mounting the bag clip onto an upper end of a pool cleaner suction mast;
   an inner support collar on said base for slide-fit reception into an open mouth of a filter bag; and
   an outer clamp ring for releasibly clamping the bag mouth onto said inner support collar, said outer clamp ring including first and second generally semi-circular clamp segments mounted for movement between a spaced-apart open position accommodating slide-fit mounting of the bag mouth onto said inner support collar and a closed position clamping the bag mouth securely onto said inner support collar.

2. The bag clip of claim 1 including alignment means for rotationally orienting said base relative to the pool cleaner suction mast.

3. The bag clip of claim 1 including alignment means for rotationally orienting the bag mouth relative to said inner support collar.

4. The bag clip of claim 1 including first alignment means for rotationally orienting said base relative to the pool cleaner suction mast, and second alignment means for rotationally orienting the bag mouth relative to said inner support collar.

5. The bag clip of claim 1 wherein said base includes mounting means comprising a pair of latch arms projecting downwardly from said base and having a pair of latch tabs respectively formed generally at lower ends of said latch arms for snap-fit reception into matingly shaped latch ports formed in the suction mast.

6. The bag clip of claim 1 wherein said base comprises a base ring.

7. The bag clip of claim 1 wherein said clamp segments are pivotally mounted on said base for movement between said open and closed positions.

8. The bag clip of claim 7 wherein said clamp segments include interengaging members for interlocking said clamp segments in said closed position.

9. The bag clip of claim 1 wherein said clamp segments include interengaging members for interlocking said clamp segments in said closed position.

10. The bag clip of claim 9 wherein said interengaging members comprise interlocking snap-fit members.

11. The bag clip of claim 9 wherein said interengaging members comprise a latch port and a latch tab formed on each of said first and second clamp segments generally at opposite ends thereof, said latch tab on said first clamp segment being interlockingly engageable with said latch port on said second clamp segment, and said latch tab on said second clamp segment being interlockingly engageable with said latch port on said first clamp segment, when said clamp segments are in said closed position.

12. The bag clip of claim 1 wherein each of said clamp segments further includes at least one radially inwardly extending rib for gripping and retaining the bag mouth on said inner support collar, when said clamp segments are in said closed position.

13. A bag clip for use with a pool cleaner having a suction mast for water flow therethrough to vacuum debris from submerged surfaces of a swimming pool, said bag clip comprising:
   a base for mounting the bag clip onto an upper end of a pool cleaner suction mast;
   an inner support collar on said base for slide-fit reception into an open mouth of a filter bag; and
   an outer clamp ring for releasibly clamping the bag mouth onto said inner support collar, said outer clamp ring including first and second generally semi-circular clamp segments mounted on said base for pivoting movement between a spaced-apart open position accommodating slide-fit mounting of the bag mouth onto said inner support collar and a closed position clamping the bag mouth securely onto said inner support collar, said clamp segments including interengaging members for interlocking said clamp segments in said closed position.

14. The bag clip of claim 13 further including first alignment means for rotationally orienting said base relative to the pool cleaner suction mast, and second alignment means for rotationally orienting the bag mouth relative to said inner support collar.

15. The bag clip of claim 13 wherein said base includes mounting means comprising a pair of latch arms projecting downwardly from said base and having a pair of latch tabs respectively formed generally at lower ends of said latch arms for snap-fit reception into matingly shaped latch ports formed in the suction mast.

16. The bag clip of claim 13 wherein said interengaging members comprise interlocking snap-fit members.

17. The bag clip of claim 13 wherein said interengaging members comprise a latch port and a latch tab formed on each of said first and second clamp segments generally at opposite ends thereof, said latch tab on said first clamp segment being interlockingly engageable with said latch port on said second clamp segment, and said latch tab on said second clamp segment being interlockingly engageable with said latch port on said first clamp segment, when said clamp segments are in said closed position.

18. The bag clip of claim 13 wherein each of said clamp segments further includes at least one radially inwardly extending rib for gripping and retaining the bag mouth on said inner support collar, when said clamp segments are in said closed position.

19. A bag clip for use with a pool cleaner having a suction mast for water flow therethrough to vacuum debris from submerged surfaces of a swimming pool, said bag clip comprising:
   a base for mounting the bag clip onto an upper end of a pool cleaner suction mast;
   an inner support collar on said base for slide-fit reception into an open mouth of a filter bag; and
   an outer clamp carried by said base for releasibly clamping the bag mouth onto said inner support collar, said outer clamp being deployable between an open position accommodating slide-fit mounting of the bag mouth onto said inner support collar and a closed position clamping the bag mouth securely onto said inner support collar.

20. A bag clip for use in combination with a filter bag having an open mouth, and a pool cleaner having a suction mast for water flow therethrough to vacuum debris from submerged surfaces of a swimming pool and to collect the vacuumed debris within said filter bag, said bag clip comprising:

a base ring for mounting the bag clip onto an upper end of said pool cleaner suction mast;

an inner support collar on said base ring for slide-fit reception into said open mouth of said filter bag; and an outer clamp ring for releasibly clamping the bag mouth onto said inner support collar, said outer clamp ring including first and second generally semi-circular clamp segments mounted on said base for pivoting movement between a spaced-apart open position accommodating slide-fit mounting of the bag mouth onto said inner support collar and a closed position clamping the bag mouth securely onto said inner support collar, said clamp segments including interengaging members for interlocking said clamp segments in said closed position.

21. The bag clip of claim 20 further including first alignment means for rotationally orienting said base relative to the pool cleaner suction mast, and second alignment means for rotationally orienting the bag mouth relative to said inner support collar.

22. The bag clip of claim 20 wherein said base ring includes mounting means comprising a pair of latch arms projecting downwardly from said base ring and having a pair of latch tabs respectively formed generally at lower ends of said latch arms for snap-fit reception into matingly shaped latch ports formed in the suction mast.

23. The bag clip of claim 20 wherein said interengaging members comprise interlocking snap-fit members.

24. The bag clip of claim 20 wherein said interengaging members comprise a latch port and a latch tab formed on each of said first and second clamp segments generally at opposite ends thereof, said latch tab on said first clamp segment being interlockingly engageable with said latch port on said second clamp segment, and said latch tab on said second clamp segment being interlockingly engageable with said latch port on said first clamp segment, when said clamp segments are in said closed position.

25. The bag clip of claim 20 wherein each of said clamp segments further includes at least one radially inwardly extending rib for gripping and retaining the bag mouth on said inner support collar, when said clamp segments are in said closed position.

* * * * *